W. J. UEBLER.
MILKING MACHINE.
APPLICATION FILED FEB. 25, 1911.
1,126,920.
Patented Feb. 2, 1915.
3 SHEETS—SHEET 1.
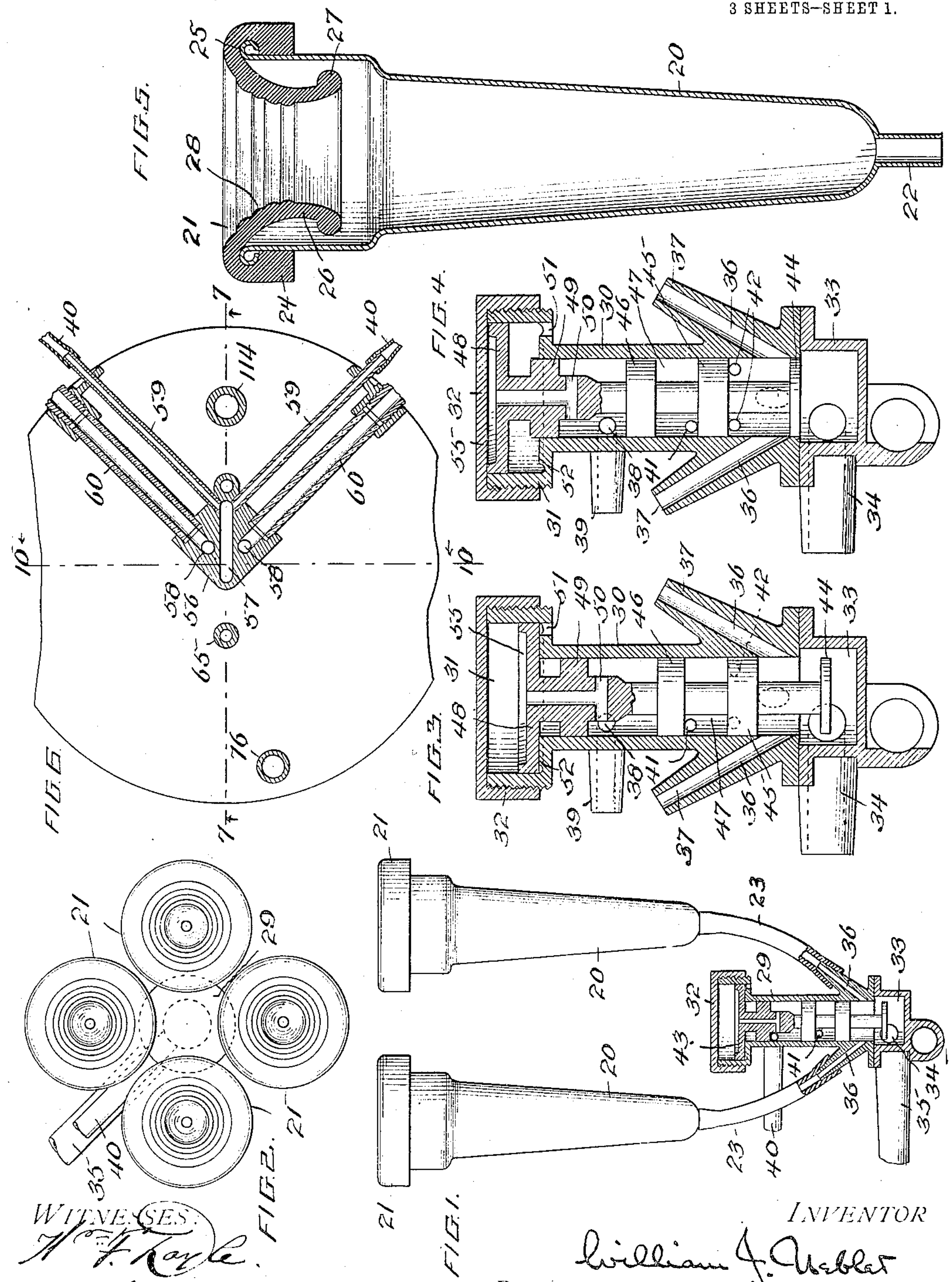
WITNESSES:
INVENTOR
BY
Attorneys W. J. UEBLER.
MILKING MACHINE.
APPLICATION FILED FEB. 25, 1911.
1,126,920.
Patented Feb. 2, 1915.
3 SHEETS—SHEET 2.
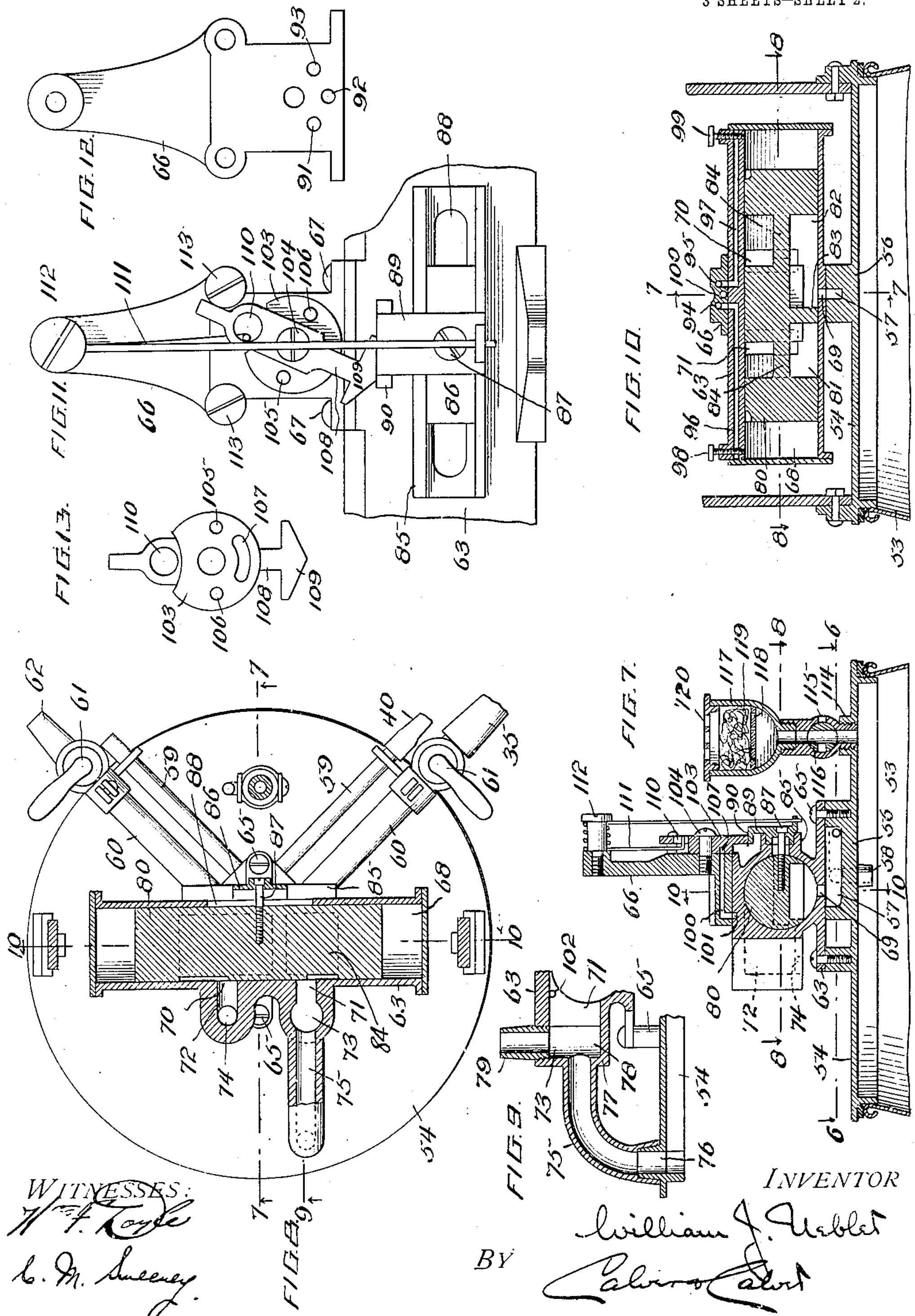
WITNESSES:
INVENTOR
BY
Attorneys W. J. UEBLER.
MILKING MACHINE.
APPLICATION FILED FEB. 25, 1911.
1,126,920.
Patented Feb. 2, 1915.
3 SHEETS—SHEET 3.
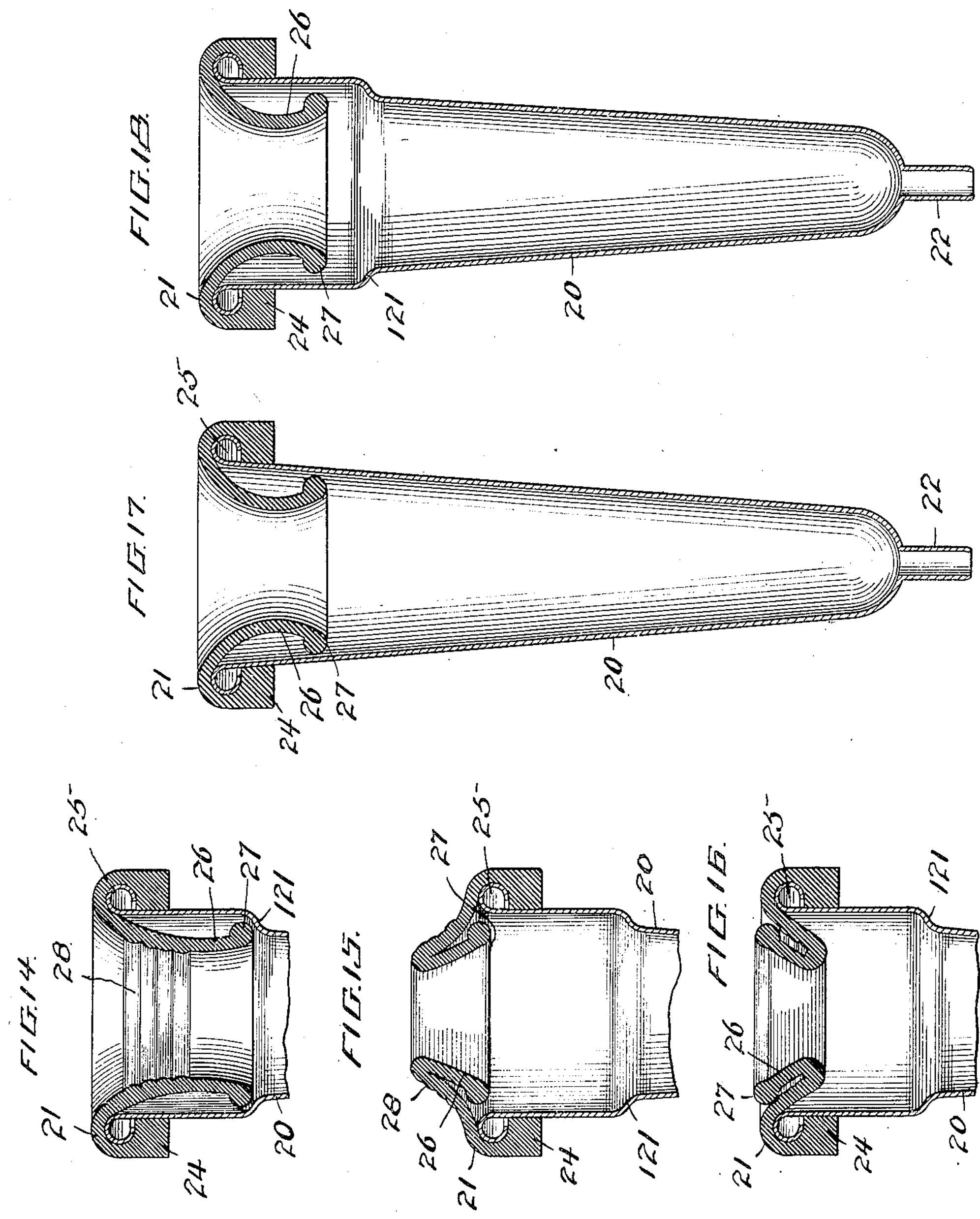
WITNESSES:
W. F. Kayle.
C. M. Sweeney
INVENTOR
William J. Uebler.
BY
Calver & Calver
Attorneys

UNITED STATES PATENT OFFICE.

WILLIAM J. UEBLER, OF WEST SCHUYLER, NEW YORK.

MILKING-MACHINE.

1,126,920. Specification of Letters Patent. Patented Feb. 2, 1915.

Application filed February 25, 1911. Serial No. 610,888.

*To all whom it may concern:*

Be it known that I, WILLIAM J. UEBLER, a citizen of the United States, residing at West Schuyler, in the county of Herkimer and State of New York, have invented or discovered certain new and useful Improvements in Milking-Machines, of which the following is a specification, reference being had therein to the accompanying drawings.

This invention relates to milking machines and has reference more particularly to machines operated by pulsating or intermittent suction, although, as will hereafter appear, certain parts of the mechanism may, if desired, be operated equally well by combined suction and compression.

In a prior application filed January 22, 1909, Serial No. 473,697, I have shown and described a milking machine designed primarily for operation by combined suction and compression, although capable of operation by either alone.

It is one of the objects of the present invention to improve and simplify the machine disclosed in said application (which contains claims covering certain parts shown and described herein) and to adapt the same more particularly for operation by differential pneumatic pressures not greater than atmospheric pressure.

These and other objects of the invention, together with means whereby the same may be carried into effect, will best be understood from the following description of one form or embodiment thereof illustrated in the accompanying drawings. It is to be understood, however, that the construction described and shown has been chosen for illustrative purposes merely and that the invention may be embodied in other forms without departing from the spirit and scope thereof.

In said drawings: Figure 1 is an elevation of a set of teat cups, the connector or common fitting therefor being shown in section. Fig. 2 is a plan view of the same. Figs. 3 and 4 are enlarged vertical sections of the teat cup fitting showing the teat cup valve in two different positions. Fig. 5 is an enlarged longitudinal section of one of the teat cups. Fig. 6 is a horizontal section taken on the line 6—6, Fig. 7, through a portion of the top of the milk receptacle and showing the milk and air passages therein. Fig. 7 is a central vertical sectional view, taken substantially on the lines 7—7, Figs. 6, 8 and 10, of the pulsating mechanism. Fig. 8 is a horizontal sectional view taken substantially on the line 8—8, Figs. 7 and 10. Fig. 9 is a fragmentary vertical section taken on the line 9, Fig. 8. Fig. 10 is a vertical sectional view of a portion of the pulsating mechanism taken on the line 10—10, Figs. 6, 7 and 8. Fig. 11 is an elevation of a portion of the pulsating mechanism as viewed from the right in Figs. 7 and 8. Fig. 12 is a detail elevation of the pulsator valve fitting with the valve removed. Fig. 13 is a detail elevation of the pulsator valve removed from its fittings, and viewed from the side opposite to that shown in Fig. 11. Figs. 14, 15 and 16 are sectional views of the upper end of a teat cup, showing the mouthpiece in different positions. Figs. 17 and 18 are sectional views of modified forms of teat cups and mouthpieces.

Referring first to Figs. 1 to 5, the teat cups are preferably arranged in sets or groups of a suitable number each, herein shown as four. In accordance with the present invention each teat cup comprises an outer rigid shell 20, formed preferably of sheet metal, and a flexible mouthpiece 21 formed preferably of rubber. The shells 20 are preferably made of an elongated tapering form adapted, particularly at their lower portions, substantially to fit the teat, and haviug at their lower ends outlet openings preferably provided with nipples 22 for the attachment of suitable rubber or other tubes 23. As shown in Figs. 5, 14, 15, 15, 16 and 18, the shells 20 are provided near their upper ends with offsets 121 forming enlargements adjacent the mouthpieces 21, while as shown in Fig. 17 the taper of the shell 20 is continuous throughout. The mouthpieces 21 are each formed with an exterior flange or rim 24 adapted to embrace the outer edge of the mouth of the shell 20, which is preferably provided with a turned or projecting edge 25 received in a groove at the base of said flange 24 to hold said mouthpiece in position. Each mouthpiece 21 is also formed with a depending tubular lip 26 normally projecting within the mouth of the shell 20. Said lip 26 is provided at its lower edge with a beading 27, while the upper part of its interior surface is preferably formed with corrugations 28, as shown in Figs. 5, 14, 15 and 16, although, if desired, these corrugations may be omitted, as shown in Figs. 17 and 18.

The beading 27 provides a smooth rounded edge at the bottom of the lip 26 and protects the animal's teat from injury by the lower edge of said lip during the milking operation and more particularly when the cup is removed. These beadings also serve to prevent the mouthpieces from being turned completely inside out when the teat cups are removed. The corrugations 28 provide a tight joint between the mouthpiece 21 and the teat, thereby preventing leakage to and from the cup and serving to hold the cup securely in place, and also oppose resistance to the entry of the teat into the cup farther than necessary when suction is applied to the cup, and thereby prevent the teat from becoming wedged into the tapered lower end of the cup, as sometimes occurs, making the removal of the cup difficult, and occasionally resulting in injury to the teat. It will be observed that the corrugations 28 do not extend entirely to the bottom of the lip 26, these corrugations and the beading 27 being preferably so arranged that in removing the cup the lip 26 may be turned inside out to a sufficient extent to bring these corrugations on the outside and thereby release the teat as shown in Fig. 15. When suction is applied to the shell 20, as by the tubes 23 as hereinafter more fully explained, a partial vacuum is formed within said shell and in the space between the lip 26 and the outer wall of the shell, causing this resilient lip to be drawn away from the teat to release the milk therein, and downwardly into the shell into substantially the position shown in Fig. 14. When this partial vacuum is relieved, as will also be presently explained, the resiliency of the lip causes the mouth piece again to grip the teat, and to be returned into substantially the position shown in Fig. 5. In order to adapt a teat cup to an unusually small teat, the mouthpiece 21 may be turned into the position shown in Fig. 16.

The teat cup fitting, designated as a whole in Fig. 1 by the numeral 29, comprises a cylindrical valve chamber 30 having at its upper end an enlarged piston chamber 31 preferably closed by a removable screw cap 32. The lower end of the valve chamber 30 is closed by a cap suitably secured thereto, said cap providing a teat cup suction chamber 33 which opens into a nipple 34 to which may be attached a suitable tube 35 leading to the milk receptacle which will presently be more fully described. Opening into the valve chamber 30, preferably at a point near the bottom thereof, are ports or passages 36 terminating in nipples 37 to which are connected the tubes 23 communicating with the teat cups. Leading from the valve chamber 30, preferably near the upper end thereof, is a port or passage 38 terminating in a nipple 39 to which may be applied a tube 40 leading to the pulsating mechanism hereinafter described.

41 denotes a port leading from the valve chamber 30 to the atmosphere below the port 38, and 42 other ports of a suitable size and number arranged between the port 41 and the passages 36, and also communicating with the atmosphere.

Within the valve chamber 30 is a controlling valve indicated as a whole in Fig. 1 by the numeral 43. At its lower end said valve is provided with a disk portion 44 adapted, when the valve is in the position shown in Fig. 4, to fit and close the lower end of the valve chamber 30. Above said disk 44 said valve 43 is formed with piston portions 45 and 46 respectively, and between which is located a groove 47 with which the port 41 is in communication in all positions of said valve. At its upper end the valve 43 is formed with a piston 48 operating in the piston chamber 31 and below said piston 48 with another piston portion 49 operating in the upper end of the valve chamber 30.

50 denotes a passage through the body of the valve 43 leading from the space between the piston portions 46 and 49, and communicating with the piston chamber 31 above the piston 48.

As will be more fully explained the tube 35 leading from the suction chamber 33 is in constant communication with the milk receptacle from which the air is partly exhausted thereby maintaining a constant partial vacuum in said suction chamber. The pulsating mechanism with which the tube 40 communicates causes that portion of the valve chamber 30 between the piston portions 46 and 49 to be placed alternately in communication with the atmosphere and with the partial vacuum in the milk receptacle. When the valve 43 is in the position shown in Fig. 3 the teat cups are in communication with the suction chamber 33 and atmospheric pressure is admitted through the port 38 and consequently to the piston chamber 31, so that the pneumatic pressure, which is atmospheric within the piston chamber 31 and less than atmospheric at the lower end of the valve 43, causes this valve to be maintained in this position.

51 denotes a port communicating with the atmosphere, and with an annular groove 52 formed in the bottom of the piston chamber 31. When the pulsating mechanism is operated to admit suction at the port 38, a partial vacuum is formed at the upper end of the piston chamber 31, so that the atmospheric pressure admitted through the port 51 to the groove 52 causes the valve 43 to rise to the position shown in Fig. 4. This causes the disk 44 to shut off communication between the teat cups and the suction chamber 33, and immediately thereafter causes the piston portion 45 to uncover the ports 42 thereby placing the teat cups in communication with the atmosphere and quickly relieving the vacuum therein. The parts are so arranged that the disk 44 causes communication between the teat cups and the suction chamber 33 to be closed before or at substantially the time that atmospheric pressure is quickly admitted to the teat cups through the ports 42. The partial vacuum in the suction chamber 33 is therefore always maintained and ready to act upon the teat cups as soon as the valve 43 is shifted to close the ports 42 and open communication between the teat cups and the suction chamber. When the valve 43 is so shifted the air in the teat cups and tubes 23 is quickly exhausted through the suction chamber 33 and milk tube 35, thereby helping to carry the milk in said milk tube to the milk receptacle. This arrangement not only results in great economy, by making it unnecessary to exhaust the air in the tube 35 and suction chamber 33 at each operation of the pulsator, but also avoids the necessity of taking into the milk passages at each operation of the pulsator any great quantity of outside air at the teat cups with the resulting danger of contamination of the milk by dust or other impurities. The amount of outside air which is admitted at each operation is only so much as is necessary to relieve the vacuum in the teat cup chambers, tubes 23, and the valve chamber space between the disk 44 and the piston portion 45, and this same air is again utilized to assist in carrying the milk through the milk tube to the milk receptacle.

It will be observed that with the valve in the position shown in Fig. 3 that portion of the valve chamber above the piston portion 46 is under atmospheric pressure, while that below the piston portion 45 is under suction. With the valve in the position shown in Fig. 4 the reverse is the case. The portions of the valve chamber above the piston portion 46 and below the piston portion 45 are therefore always under different pneumatic pressures. To prevent leakage from one end of the valve chamber to the other, the groove 47 and the port 41 are provided. Also in order to prevent the piston 48 from becoming trapped in the position shown in Fig. 3, by reason of the formation of a partial vacuum beneath some portion of said piston the annular groove 52 is provided which causes the lower side of said piston to be in communication with the atmosphere throughout its periphery. For similar reasons the upper side of the piston 48 is formed with a cavity 55, thereby insuring the admission of atmospheric air above said piston through the passage 50 when the pulsating mechanism is in the proper position.

Referring now to Figs. 6 to 13, 53 denotes a milk receptacle of any suitable form provided with an air tight cover or top 54. The cover 54 is preferably provided with a boss 56 in which is formed an air passage 57 and a milk passage or passages 58, the latter passing through the cover 54 and communicating with the interior of the receptacle 53. The air passage 57 communicates with a tube or tubes 59, each of which is connected with a tube 40 leading to the valve chamber 30 of a teat cup fitting. The milk passage or passages 58 each communicates with a tube 60, preferably of glass, which, as shown, terminates at a valve 61 provided with a nipple 62 to which is attached a tube 35 leading to the suction chamber 33 of a teat cup fitting.

Mounted on the cover 54 is the pulsating mechanism including a pulsator casing 63 secured, as by screws 65, to said cover, and having an extension or pulsator valve fitting 66 which is preferably made separate from the casing 63 and secured thereto by screws 67. The casing 63 is formed with a preferably cylindrical pulsator chamber 68 having a port 69, communicating with the air passage 57, and ports 70 and 71 communicating respectively with the air intake chamber 72 and the pulsator vacuum or suction chamber 73. The air intake chamber 72 has a downwardly disposed inlet opening 74 in communication with the atmosphere. This arrangement prevents dirt or other obstructions from dropping into this opening and obviates the necessity of a screen at this point. The vacuum chamber 73 communicates, through a pipe 75 leading to an opening 76 in the cover 54, with the interior of the milk receptacle. Intermediate the pulsator chamber 68 and pipe 75 the chamber 73 is provided with a wall or dam 77 forming a well or trap 78 to catch oil or other impurities from the pulsating mechanism and prevent the same from entering the milk receptacle. The pulsator suction chamber 73 is provided with a nipple 79 for connection with a suction pump or other apparatus for exhausting the air from the milk receptacle.

The pulsator proper comprises a piston 80 reciprocating in the chamber 68 and formed with cavities or chambers 81 and 82 extending across substantially the entire transverse area of said chamber 68 and separated by a web 83. In order to strengthen the piston 80 the chambers 81 and 82 are divided by webs or partitions 84 extending part way across said chambers. Mounted in guides 85 on the exterior of the pulsator casing is a slide 86 connected with the piston 80 by a screw 87 passing through a slot 88 in the pulsator casing and carrying an arm 89 having at its end a valve controlling flange 90.

The pulsator valve fitting 66 is provided in its face (see Fig. 12) with three ports 91, 92, and 93 respectively. The ports 91 and 93 open into passages 94 and 95, respectively, (see Fig. 10) which communicate with passages 96 and 97 in the pulsator casing, said last named passages leading to opposite ends of the pulsator chamber 68. The openings of said passages into said chamber are controlled by adjustable valves 98 and 99. The port 92 opens into a passage 100 (see Figs. 7 and 10) which communicates with a passage 101 in the pulsator casing and leads to a port 102 (see Fig. 9) opening into the pulsator vacuum chamber 73.

The pulsator valve 103 comprises a flat disk pivoted at 104 to the extension or fitting 66 and having perforations 105 and 106 adapted to register with the ports 91 and 93 and a cavity 107 adapted to connect the port 92 with either of the ports 91 or 93 according to the position of the valve. The valve 103 carries an arm 108 having at one end an oppositely beveled shoe 109, adapted to engage the flange 90 to hold the valve in its opposite positions, and at the other with an aperture 110 to receive the end of a spring 111 which passes loosely about a stud 112 and is connected at its opposite end to the lower end of the arm 89. Movement of the valve 103 on its pivot is limited by the engagement of the end of the arm 108 with studs 113.

In order to relieve the vacuum in the milk receptacle after the milking operation there is provided a short air inlet pipe 114 preferably provided with a lateral opening 115 (see Fig. 7) and with a three way valve 116. The pipe 114 terminates in a threaded socket to which may be attached a vacuum gage (not shown) or a detachable air filter 117 comprising a cup shaped receptacle containing a foraminous plate 118 for supporting cotton or other filtering material 119 and closed by a foraminous cover 120. After the milking operation and before the suction apparatus is disconnected from the nipple 79, the valve 116 is turned to allow air to enter the milk receptacle through the filter 117, if such be used, or if a gage be attached to the pipe 114 the valve 116 may be turned to vent the receptacle through the opening 115. By this means the vacuum in the milk receptacle may be relieved by dry, outside air without the necessity of drawing air through the pulsator, suction pipe, or milk pipes which may become more or less foul and which are always damp from the moisture from the milk.

The operation is as follows. When the parts of the pulsating mechanism are in the position shown in Figs. 7, 8, 10, and 11, the perforation 106 in the pulsator valve 103 registers with the port 93 while the cavity 107 connects the ports 91 and 92. Atmospheric air entering the port 93 passes through the passages 95 and 97 to the right end of the pulsator chamber 68, as shown in Fig. 10. At the same time the left end of said chamber is in communication with the interior of the milk receptacle through the passages 96 and 94, port 91, cavity 107, port 92, passages 100 and 101, port 102, pulsator vacuum chamber 73, and pipe 75. The pulsator is therefore moving toward the left, being shown in Figs. 8, 10, and 11 about midway of its travel. When the pulsator is in the position shown in Fig. 10, atmospheric air enters the chamber 72 through the inlet opening 74 and passes thence through the port 70, pulsator chamber or cavity 82, port 69, passage 57 (see Fig. 6), tubes 59 and 40 (see Figs. 1 and 3), and port 38 to that portion of the teat cup valve chamber 30 between the piston portions 46 and 49. This, as heretofore described, causes the valve 43 to occupy the position shown in Fig. 3, placing the interior of the teat cups in communication, through the tubes 23 and passages 36, with the suction chamber 33, and applying suction thereto.

During the travel of the pulsator 80 toward the left, as above described, tension is placed upon the spring 111 (see Fig. 11), which tends to turn the pulsator valve 103 on its pivot 104 from right to left. This movement, however, is opposed by the engagement of the shoe 109 with the flange 90 until the pulsator has substantially reached the limit of its travel toward the left. At this time the spring 111 turns the valve 103 carrying the perforation 106 out of register with the port 93, bringing the perforation 105 into register with the port 91 and carrying the cavity 107 into position to connect the ports 92 and 93. Atmospheric air thereupon enters the port 91 and passes through the pasages 94 and 96 to the left end of the pulsator chamber 68. At the same time suction is applied to the right end of said chamber through the passages 97 and 95, port 93, cavity 107, port 92, passages 100 and 101, port 102 and pulsator vacuum chamber 73. The pulsator 80 thereupon moves toward the right. When the web 83 passes the port 69 the vacuum or suction in the milk receptacle is communicated, through the pulsator vacuum chamber 73, port 71, pulsator cavity 81, port 69, passage 57, and tubes 59 and 40, to the port 38 in the teat cup fitting. This, as heretofore explained, causes the teat cup valve 43 to be moved into the position shown in Fig. 4, thereby shutting off communication between the teat cups and the suction chamber 33 and venting said cups through the ports 42. Upon the arrival of the pulsator piston at the limit of its movement toward the right the valve 103 is again shifted and the operations are repeated.

While the above described mechanism is designed primarily and is particularly adapted for operation by suction alone, it will be observed that with slight modification many features thereof might be readily applicable to a machine operated by combined suction and compression.

Having thus described my invention I claim and desire to secure by Letters Patent:

1. In a milking machine, in combination, a milk receptacle, pulsating mechanism associated therewith, a teat cup having a teat chamber, a teat cup fitting located adjacent said cup and having a suction chamber, a tube connecting said suction chamber and milk receptacle, and automatic means controlled by said pulsating mechanism for alternately placing said teat chamber in communication with said suction chamber and with the atmosphere.

2. In a milking machine, in combination, a milk receptacle, pulsating mechanism associated therewith, a teat cup having a teat chamber, a teat cup fitting located adjacent said cup and having a valve chamber in communication with said teat chamber, a suction chamber in communication with said valve chamber and one or more ports leading from said valve chamber to the atmosphere, tubes connecting said valve and suction chambers respectively with said pulsating mechanism and milk receptacle, and a valve in said valve chamber and controlled by said pulsating mechanism, said valve having a part adapted to close communication between said suction chamber and valve chamber and a part adapted to cover and uncover said port or ports.

3. In a milking machine, in combination, a teat cup fitting having a valve chamber, a valve in said fitting having piston portions, and means for supplying differential fluid pressures to the opposite ends of said chamber, said chamber having a port intermediate its ends communicating with the atmosphere, and said valve having a groove intermediate said piston portions and in communication with said port in all positions of said valve.

4. In a milking machine, in combination, a teat cup, a teat cup fitting having a valve chamber, a suction chamber, and a plurality of ports leading from said valve chamber to the atmosphere, and a valve in said fitting having means for alternately placing said teat cup in communication with said suction chamber and with one or more of said ports and a groove in communication with another of said ports in all positions of said valve.

5. In a milking machine, the combination with a teat cup fitting having a valve chamber and a piston chamber, of a valve operating in said valve chamber and having a piston operating in said piston chamber, said piston chamber having an annular groove in its end and a port connecting said groove with the atmosphere.

6. In a milking machine, the combination with a teat cup fitting having a valve chamber and a piston chamber, of a valve having a piston portion operating in said valve chamber, a piston operating in said piston chamber, and a passage leading from said valve chamber at one side of said piston portion to said piston chamber at the opposite side of said piston, said piston having in its face a cavity with which said passage communicates.

7. In a milking machine, the combination with a teat cup fitting having a valve chamber and a piston chamber, of a valve having a piston portion operating in said valve chamber, a piston operating in said piston chamber, and a passage leading from said valve chamber at one side of said piston portion to said piston chamber at the opposite side of said piston, said piston having in its face a cavity with which said passage communicates, and said piston chamber having in its end opposite the cavity in said piston an annular groove and a port connecting said groove with the atmosphere.

8. In a milking machine, a teat cup comprising a rigid shell and a flexible mouth piece having a tubular lip depending within said shell, the depending portion of said lip being formed with interior corrugations.

9. In a milking machine, a teat cup comprising a rigid shell and a flexible mouth piece having a tubular lip depending within said shell and a beading at the edge of said lip, the depending portion of said lip being formed with interior corrugations.

10. In a milking machine, the combination with a pulsator chamber, of a pulsator piston therein formed with chambers or cavities extending across substantially the entire transverse area of said pulsator chamber, and supporting webs extending partly across said piston chambers or cavities.

11. In a milking machine, in combination, a milk receptacle, a pulsator casing having a pulsator chamber in communication with said milk receptacle, and a dam intermediate said chamber and receptacle.

12. In a milking machine, in combination, a milk receptacle and a pulsator casing having a pulsator chamber in communication with said milk receptacle and a trap intermediate said chamber and receptacle arranged to receive impurities escaping from said pulsator chamber and prevent passage thereof to said milk receptacle.

13. In a milking machine, in combination, a milk receptacle and a pulsator casing having a pulsator chamber, a vacuum chamber in communication with said pulsator chamber and with said milk receptacle, and a well in said vacuum chamber.

14. In a milking machine, in combination, a milk receptacle, a teat cup in communication with said receptacle, a pulsating mechanism in communication with said teat cup and with said receptacle, and means for admitting air to said receptacle independently of said teat cup and pulsating mechanism.

15. In a milking machine, in combination, a milk receptacle, a teat cup in communication with said receptacle, a pulsating mechanism in communication with said teat cup and with said receptacle, a pipe for admitting air into said receptacle independently of said teat cup and pulsating mechanism, said pipe having a lateral opening, and a three-way valve in said pipe.

16. In a milking machine, in combination, a milk receptacle, a teat cup in communication with said receptacle, a pulsating mechanism in communication with said teat cup and with said receptacle, a pipe for admitting air into said milk receptacle independently of said teat cup and pulsating mechanism, and an air filter connected with said pipe.

17. In a milking machine, in combination, a milk receptacle, a teat cup in communication with said receptacle, a pulsating mechanism connected with said teat cup and with said receptacle, a pipe for admitting air to said receptacle independently of said teat cup and pulsating mechanism, and an air filter detachably connected to said pipe.

18. In a milking machine, in combination, a milk receptacle, a teat cup in communication with said receptacle, a pulsating mechanism connected with said teat cup and with said receptacle, a pipe for admitting air to said receptacle independently of said teat cup and pulsating mechanism, said pipe having a lateral opening, a three-way valve in said pipe controlling said opening, and an air filter detachably connected to said pipe beyond said valve.

19. A pulsating mechanism for milking machines, including, in combination, a pulsator casing having a pulsator chamber and air passages leading into each end of said chamber, a piston in said chamber, a pivoted disk valve controlling said air passages, a spring connected at one end to said valve and at the other to said piston, and means for releasing said valve substantially when said piston reaches the limit of its movement and at other times holding it.

20. In a pulsating mechanism for milking machines in combination, a pulsator casing having a pulsator chamber, and air passages communicating with the ends of said chamber, a reciprocating piston in said chamber, a pivoted disk valve controlling said air passages, a spring for operating said valve connected at one end to the valve and at the other end to said piston and alternately placed under tension in opposite directions by the movement of said piston, and means connected with said piston for holding and releasing said valve.

21. In a pulsating mechanism for milking machines, in combination, a pulsator casing having a pulsator chamber and air passages leading thereto, a pulsator valve fitting having air passages communicating with said first-named air passages and terminating in ports in the face of said fitting, and a pivoted disk valve movable on the face of said fitting for controlling said ports.

22. In a pulsating mechanism for milking machines, in combination, a pulsator casing having a pulsator chamber, a suction chamber, air passages communicating with said pulsator chamber and an air passage communicating with said suction chamber, and a valve having a pair of ports opening to the atmosphere and adapted to be brought alternately into register with said first-named air passages and a cavity adapted to connect said last-named passage with either of said first-named passages alternately.

23. In a pulsating mechanism for milking machines, in combination, a pulsator casing having a pulsator chamber, a suction chamber, air passages communicating with said pulsator chamber and an air passage communicating with said suction chamber, and a pivoted disk valve having a pair of ports opening to the atmosphere and adapted to be brought alternately into register with said first-named air passages and provided with a cavity adapted to connect said last-named passage with either of said first-named passages alternately.

24. In a pulsating mechanism for milking machines, in combination, a pulsator casing having a pulsator chamber and air passages leading into each end of said chamber, a piston in said chamber, a pulsator valve fitting having air passages communicating with said first-named air passages and terminating in ports in the face of said fitting, a valve movable on the face of said fitting for controlling said ports, a spring connected at one end to said valve and at the other to said piston, and means for releasing said valve substantially when said piston reaches the limit of its movement and at other times holding it.

25. In a pulsating mechanism for milking machines, in combination, a pulsator casing having a pulsator chamber, a suction chamber, air passages communicating with said pulsator chamber, and an air passage communicating with said suction chamber, a pulsator valve fitting having air passages communicating with said first-named air passages and terminating in ports in the face of said fitting and an air passage communicating with said second-named air passage and also terminating in a port in said face, and a valve movable on the face of said fitting and having a pair of ports opening to the atmosphere and adapted to be brought alternately into register with said first-named ports and a cavity adapted to connect said second-named port with either of said first-named ports.

26. In a pulsating mechanism for milking machines, a pulsator casing having a pulsator chamber and a downwardly disposed air inlet communicating with said chamber.

27. In a pulsating mechanism for milking machines, a pulsator casing having a pulsator chamber and an air chamber communicating therewith, said air chamber having a downwardly disposed inlet opening.

28. In a milking machine, in combination, a milk receptacle, pulsating mechanism associated therewith, a teat cup having a teat chamber, a milk tube connecting said teat chamber and milk receptacle, and automatic means controlled by said pulsating mechanism for closing communication between said teat cup and milk tube and admitting air to said teat cup and for thereafter exhausting said air from said teat cup to said milk tube.

In testimony whereof I affix my signature, in presence of two witnesses.

WILLIAM J. UEBLER.

Witnesses:

RUTH B. GOODWIN,

ESTHER GOODWIN.